United States Patent
Takahashi et al.

[15] 3,671,937
[45] June 20, 1972

[54] AUTOMATIC PATTERN TRACING SYSTEMS

[72] Inventors: Tadashi Takahashi; Masatoshi Miyazaki, both of Sendai; Yasuhiko Ogawa, Natori; Tadashi Sato; Kazuhiko Kakuta, both of Tokyo, all of Japan

[73] Assignee: Iwatsu Electric Company, Ltd., Suginamiku, Tokyo, Japan

[22] Filed: May 28, 1970

[21] Appl. No.: 41,297

[30] Foreign Application Priority Data

May 31, 1969 Japan.................................44/42071
May 31, 1969 Japan.................................44/42072

[52] U.S. Cl......................................340/146.3 AE, 250/202
[51] Int. Cl..........................................................G06k 9/16
[58] Field of Search....................250/202, 219 QA; 318/577; 340/146.3 AE; 178/6.8

[56] References Cited

UNITED STATES PATENTS 2,816,705  12/1957  Thrall et al. ...........................250/202
3,245,036  4/1966  Gröttrup............................250/202 X
3,429,989  2/1969  Stockdale .........................250/202 X Primary Examiner—Maynard R. Wilbur
Assistant Examiner—Leo H. Boudreau
Attorney—Chittick, Pfund, Birch, Samuels & Gauthier

[57] ABSTRACT

An automatic system for tracing a pattern depicted on a sheet of drawing comprises a detector operative to determine the presence or absence of the pattern to convert it into an electric signal, tracing direction detecting means responsive to the electric signal to judge whether the pattern is to be traced or not so as to provide a signal for moving the detector in the tracing direction, a driving mechanism responsive to the signal from the tracing direction detecting means to relatively move the detector in a predetermined direction by a predetermined distance and means to generate a digital signal corresponding to the tracing direction or a tracing spot, said detector detecting the information regarding the presence or absence of the pattern in an area close to the pattern to be traced thus continuously tracing the same.

2 Claims, 7 Drawing Figures

TADASHI TAKAHASHI
MASATOSHI MIYAZAKI
YASUHIKO OGAWA    INVENTORS
TADASHI SATO
KAZUHIKO KAKUTA

ATTORNEY

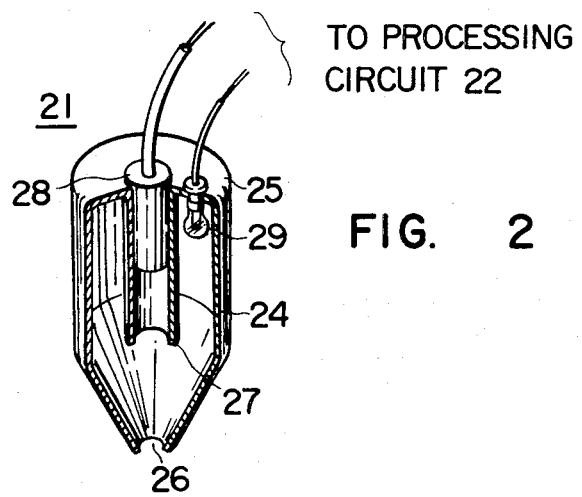
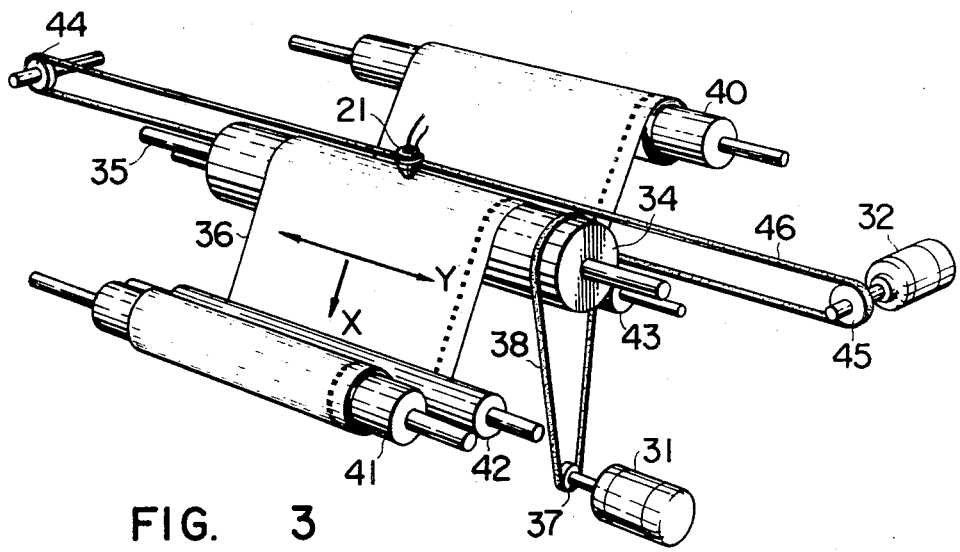

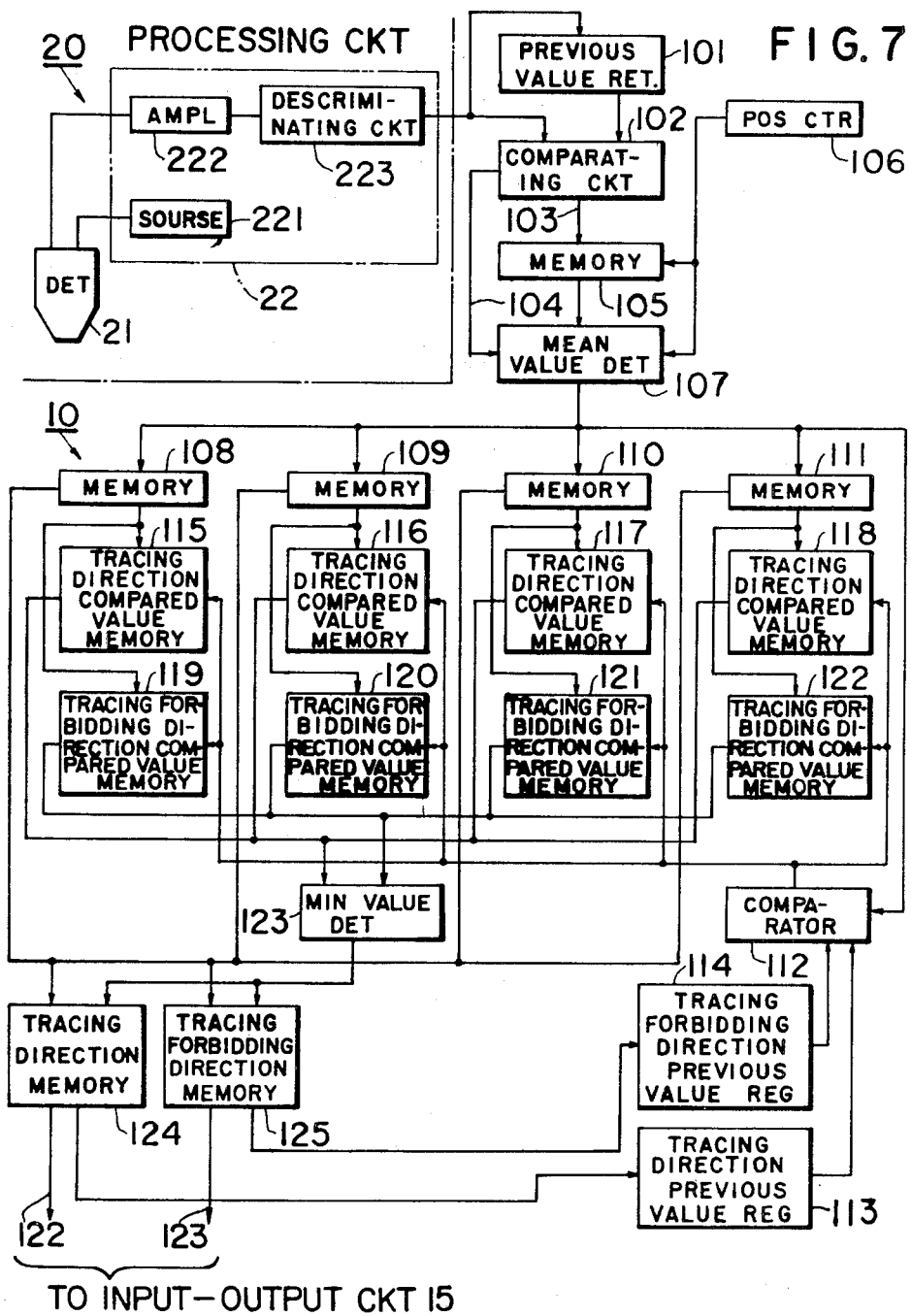

AUTOMATIC PATTERN TRACING SYSTEMS

CROSS REFERENCE TO RELATED APPLICATIONS

This application is related to applications filed of even date herewith, Ser. Nos: 41,172, 41,296, 41,291 and 41,471, all assigned to the assignee of the present invention.

BACKGROUND OF THE INVENTION

This invention relates to an automatic pattern tracing system and more particular to a system for automatically tracing a pattern depicted on a sheet of drawing to convert it into a digital signal.

In many fields of engineering it is desirable to automatically trace patterns in the form of various curves, segments and the like depicted on a sheet of drawing to convert them into electrical digital signals. Such requirements arise when various waveforms such as, cardiograms, brain waves, earthquake waves and the like, for example, are to be automatically analyzed to identify their patterns. Further, when supplying various data curves to a standard electronic computor, at present such data curves are converted into technical terms with a great labor and time and the converted information is then supplied to the input device of the computor.

SUMMARY OF THE INVENTION

It is therefore an object of this invention to provide an automatic pattern tracing system which functions to automatically trace various patterns depicted on a sheet to provide digital outputs of the traced information.

A further object of this invention is to provide an automatic pattern tracing system providing information directly useable as the inputs to electronic computers.

Still further object of this invention is to provide a novel automatic tracing system which can correctly trace the pattern always along the direction thereof in response to the detected signal.

Another object of this invention is to provide an automatic pattern tracing system which can determine a particular one of a plurality of detector outputs which is to be traced.

Still another object of this invention is to provide an automatic pattern tracing system which repeats the tracing operation for a selected portion of the pattern.

Further object of this invention is to provide a novel system applicable to a function generator which generates an electric signal corresponding to the configuration of a curve.

According to this invention, the presence or absence of a pattern at a given point on a drawing is detected by means of a detector and the detected pattern is converted into an electrical signal which is utilized to determine in which direction the pattern is to be traced. According to this determination or judgement a signal is generated to shift the detector in the direction to be traced. Responsive to this signal a drive means shifts the drawing or detector over a predetermined distance in the desired direction thus tracing the pattern on the drawing. Such a partial tracing operation is repeated to trace the entire pattern. Each partial tracing operation generates a digital signal corresponding to a tracing direction or tracing point. Memory means is provided to memorize the direction to be traced and the direction along which the tracing is forbidden for each tracing operation. The stored information is used to determine the direction to be traced, forbidden direction and directions other than these two directions, thus enabling to determine an appropriate tracing direction.

BRIEF DESCRIPTIONS OF THE DRAWINGS

The invention can be more fully understood from the following detailed description taken in conjunction with the accompanying drawings in which:

FIG. 2 is a perspective view, partly in section, of a detector utilized in the system shown in FIG. 1;

FIG. 3 is a perspective view of the driving mechanism shown in FIG. 1 showing the relationship between a recording paper carrying a pattern, and the detector;

FIG. 7 shows a block diagram wherein respective program operations of the system shown in FIG. 1 are replaced by hardware.

DESCRIPTION OF THE PREFERRED EMBODIMENT

Figure 1:
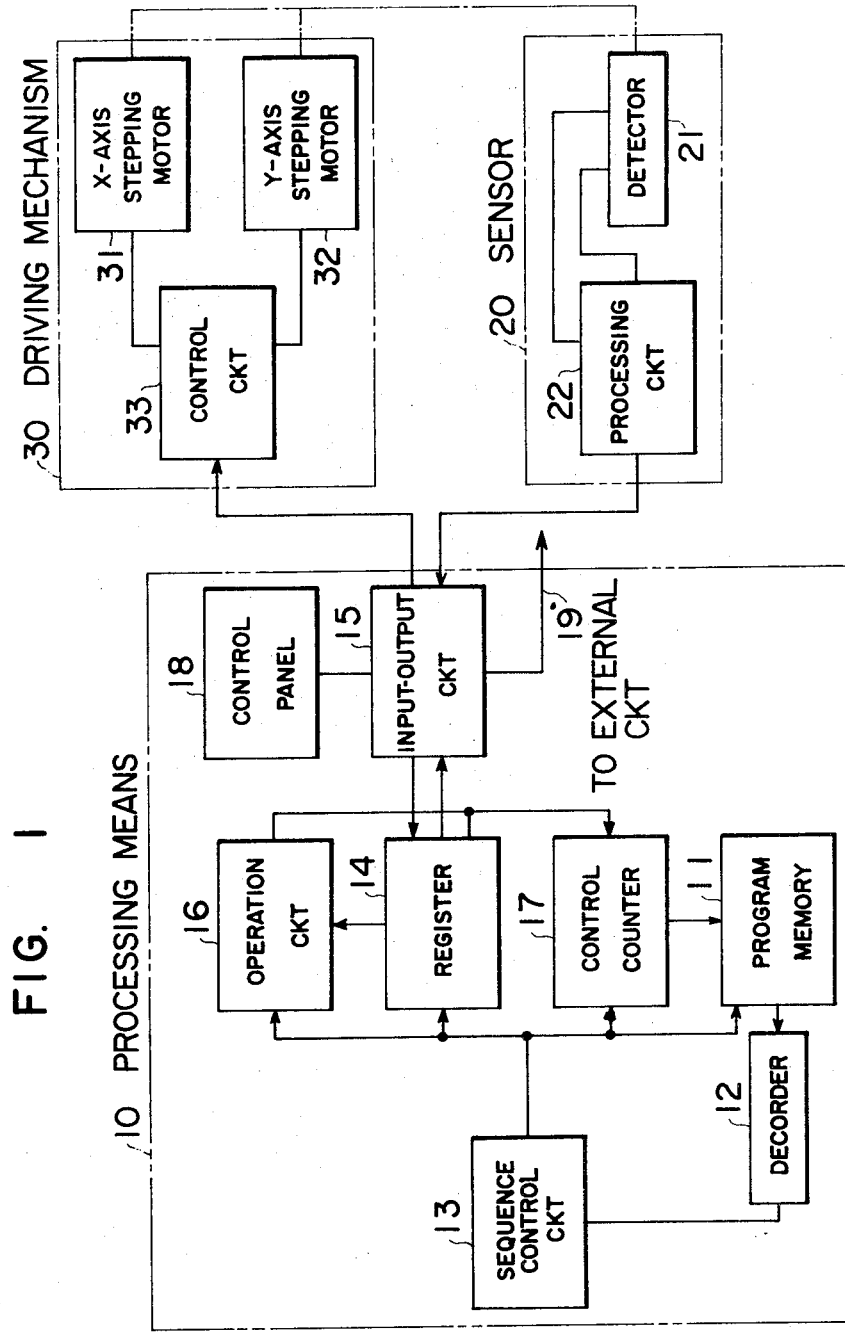
FIG. 1 is a block diagram of one embodiment of an automatic pattern tracing system constructed according to the principle of this invention.

Referring now to FIG. 1 of the accompanying drawing, the entire system of this invention is shown as comprising a processing means 10, a sensor 20 and a driving mechanism 30, the sensor reading the positional information of a pattern to be traced and depicted on a sheet of drawing to send the information to the processing means 10. The processing means 10 suitably processes the information so as to operate the driving mechanism 30 in accordance with the resulting digital signal thus shifting sensor 20 a predetermined distance in a predetermined direction. Then the positional information of the pattern at the shifted position is again read by sensor 20. The above described cycle of operations is repeated to automatically trace the entire pattern. The digital signal produced at each time is via line 19 to an electronic computor and the like, not shown.

The detail of each component part will now be described. The sensor 20 comprises a detector 21 to convert the concentration, that is, the white and black tones of the pattern into electric signals and a processing circuit 22 to suitably process electrically the output from the detector 21. In this embodiment, the detector 21 comprises a photoelectric detector of the construction shown in FIG. 2. As shown in FIG. 2, the detector 21 comprises a cylindrical casing 24 of opaque material having a top closed end 25 and a frustoconical bottom portion having a bottom opening 26. Inside the casing 24 is formed a cylinder 27 concentrically with casing 24. One end of the cylinder 27 is secured to the upper end 25 of the casing 24 while the opposite end is terminated at a point slightly above the bottom opening 26. Within cylinder 27 is disposed a light receiving element or a photoelectric converting element 28 and a light source 29 is disposed in a space between cylinder 27 and casing 24. Accordingly, when sensor 20 is in its operating state, light is projected toward outside from source 29 through opening 26. The photoelectric converting element 28 operates to receive the light projected upon a point being scanned on the pattern and reflected therefrom and transforms it into an electric signal.

The processing circuit 22 operates to shape the waveform of the electric signal supplied from photoelectric converting element 28 to descriminate white and black to provide a binary output of "1" or "0", the former corresponding to white and the latter to black. These signals are continuously supplied to processing means 10 from sensor 20.

The driving mechanism 30 comprises two stepping motors 31 and 32 and a control circuit 33 to control stepping motors in response to a signal supplied from processing means 10, the detail of the driving mechanism being shown in FIG. 3.

As shown in FIG. 3 the driving mechanism comprises a rotary drum 34 having a shaft 35 and a recording paper 36 described with a pattern to be traced by the detector 21 is passed about the periphery of rotary drum 34. The rotary drum 34 is driven by stepping motor 31 via a belt 38 to drive the recording paper 36 in a direction indicated by an arrow (X axis). The recording paper 36 is moved between a supply reel 40 and a take up reel 41 via guide rollers 42 and 43 which function to cause the recording paper 36 to directly engage the peripheral surface of rotary drum 34. An endless belt 46 is passed around a pair of spaced apart pulleys 44 and 45 and the detector 21 is secured at a predetermined position along the length of belt 46. It is to be understood that the detector 21 is disposed so that its bottom opening 26 is directed toward the axis of rotary drum 34 and that it is moved along the surface of the drum 34 in a direction indicated by an arrow (Y axis). The pulley 45 is driven by the Y axis stepping motor 32. Responsive to one pulse from the control circuit 33 each of the stepping motors 31 and 32 steps a definite angle to move recording paper 36 and detector 21 by a definite distance. Thus, stepping motors 31 and 32 effect relative movement of about 0.1 mm, for example, between recording paper 36 and detector 21 at each step. Thus, it will be seen that the driving mechanism has the same construction and function as the prior art incremental X, Y plotter.

With reference again to FIG. 1, the processing means 10 comprises a program memory 11 storing a program necessary for the scanning and tracing operations of the pattern, a decoder 12 to read the program supplied by the program memory 11, a sequence control circuit 13 to control the operating sequence of various component parts to be described later and a group of registers 14 comprised by a plurality of serially connected shift registers. The majority of these shift registers function to temporarily store a signal from an input-output circuit 15 while the remaining shift registers function to store constants, modes, memory addresses, return addresses and the like. These shift registers operate in response to a sequence control signal supplied from the sequence control circuit 13 described above. An operation circuit 16 is provided to perform such operations and processings as addition, subtraction, logical product and logical addition, etc., in response to a signal supplied from the group of shift registers 14. The type of the operations is selected by an operation sequence control signal supplied from the sequence control circuit 13. A control counter 17 is provided to designate the address in the memory 11 storing the program. Thus the control counter 17 contains the content of a field representing the jumping address at the time of jumping order but the contents of the return address shift register in the group of registers 14 when the order is returned from a subroutine. There is also provided control panel 18 including various switches and indicators necessary for operating the system.

When a start switch (not shown) of a control panel 18 is depressed the various components shown in FIG. 1 commence to operate so that the detector 21 of sensor 20 begins to trace the pattern according to the program stored in the memory 11. Detector 21 is driven by the driving mechanism 30 to perform a round scanning operation of a substantially square area including the pattern on the recording paper 36 which is to be traced. As used herein the term "a round scanning" means a scan path around the periphery of a designated elemental area. Such a round scanning can be performed by the proper control of stepping motors 31 and 32 of the driving mechanism 30 provided by the control circuit 33. The number of spots to be plotted by the round scanning operation can be selected to any value by the command from the control panel 18. In an example shown in FIG. 4, 10 spots are plotted in the direction of X axis and 10 spots are plotted in the direction of Y axis. Accordingly, a total of 40 spots are plotted at each round scanning operation.

A tracing operation performed on a typical pattern on the recording paper 36 is as follows.

Figure 4:
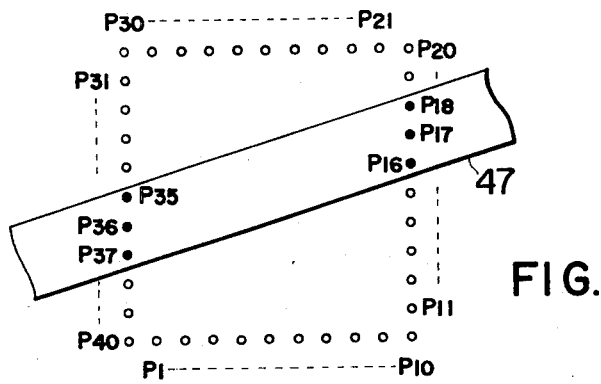
FIG. 4 is a diagram to explain the relationship between the round scanning operation of the detector, the detector output and the output from a processing circuit when a curve depicted on the recording paper is traced.

FIG. 4 shows a diagram to explain the operation of the detector 21 to trace a pattern, e.g. a curve 47 on the recording paper 36. $P_1$, $P_2$ ... $P_{40}$ show scanning spots as the detector 21 performs a round scanning operation of the pattern on the recording paper by being moved along the periphery of a square area. White dots and black dots represented on positions corresponding to these scanning spots show the results obtained by judging the output of the detector 21 generated by scanning these spots, by the operation of the processing circuit 22. More particularly, a white dot at a spot $P_1$ shows that the result provided by judging the output from detector 21 corresponding to this spot by means of processing circuit 22 is "white". In the same manner, a black dot at a spot $P_{16}$ shows that the result provided by judging the output from detector 21 corresponding to this spot by means of the processing circuit 22 is "black". A dot shows that there is present a pattern of same type at that spot. Accordingly, in the illustrated example, the black dots show that the pattern includes spots $P_{16}$, $P_{17}$, $P_{18}$ and spots $P_{35}$, $P_{36}$ and $P_{37}$. It is clear that in this case the curve 47 is traced by these two groups of information and by information obtained during the previous scanning. These two groups of information are supplied to the group of registers 14 from the processing circuit 22 via the input-output circuit 15 of the processing means 10 and are stored in these registers. These groups of information stored in the registers 14 are operated and processed by the operation circuit 16 according to the prescribed program. First, of said two groups of spots, spots $P_{17}$ and $P_{36}$ near the center of curve 47 are determined. These spots near the center can be determined by averaging the maximum value and the minimum value of the numbers of the spots of respective groups and the value obtained is stored in registers 14. Spots $P_{17}$ and $P_{36}$ represent the direction of curve 47 and either one of them represents the direction of tracing. In order to determine which one of the information spots at the center of respective groups represents the direction of tracing, the direction of tracing in the previous scanning is stored in the registers 14. Consequently, the direction most close to the direction of previous scanning is judged as the direction of tracing. For this reason, in the succeeding scanning operation this direction is treated as the direction of previous scanning. The direction in which the tracing is forbidden is treated in the same manner. The center of the above described round scanning is considered to lie generally on a curve 47.

Figure 5:
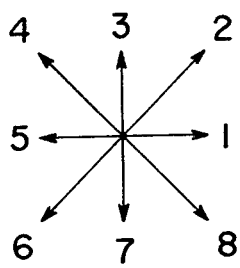
FIG. 5 shows one example of predetermined reference directions utilized to determine the pattern tracing direction of the detector.

With reference now to FIG. 5, a method of judging the direction along which the detector 21 is to be traced will be described in the following. As shown in FIG. 5, eight reference directions 1 to 8 are predetermined. These directions are designated by codes "1", "2" . . . "8" in the clockwise direction. If it is assumed now that the spot $P_{17}$ represents the direction of scanning, this spot is made to correspond to reference direction "1" and an output corresponding to this "1" direction is sent to control circuit 33 of driving mechanism 30 from registers 14 via input-output circuit 15, and the positional information of spot 17 is stored in register group 14. In FIG. 4, since there are 40 spots to be plotted it is necessary to store the number of these spots, and the stored number is treated to represent the direction of previous tracing during the succeeding scanning operation.

Figure 6:
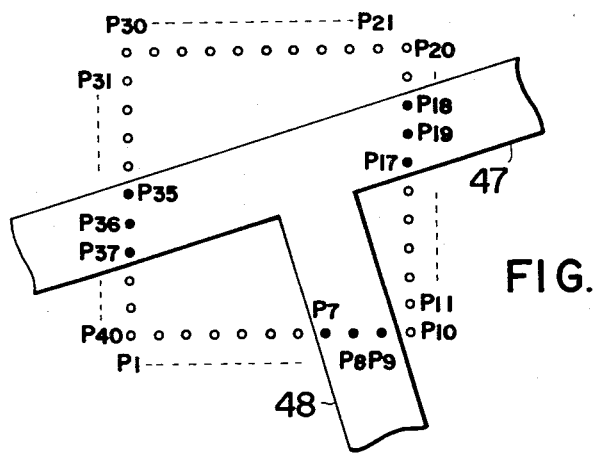
FIG. 6 is a diagram to show the relationship between the round scanning operation of the detector, the detector output and the output from the processing circuit when a curve depicted on a recording paper includes a branch line.

FIG. 6 is a diagram to explain the tracing operation where curve 47 includes a branch line 48. In this case, information groups are obtained representing that the pattern lies on spots $P_{35}$, $P_{36}$, $P_{37}$; $P_{16}$, $P_{17}$, $P_{18}$; and $P_7$, $P_8$, $P_9$. As a result, like the foregoing description with reference to FIG. 5 the processing means 10 provides information of spots $P_{36}$, $P_{17}$ and $P_8$ which are at the centers of the above described three groups of information and these data are compared with those of the previous scanning to determine which spot corresponds to the direction of tracing whereby to send a signal to the driving mechanism 30 for performing the tracing operation in the tracing direction thus determined. In this case, in addition to the information regarding the direction to be traced and the direction that has been traced an information regarding spot $P_8$ is obtained which shows that there is a branched or crossing curve 48, thus requesting processing means 10 to perform another operation. If the tracing directions at respective scanning operations are represented by codes such as "2, 2, 1, 3, 1 . . . ", these data will represent the configuration of the curve.

The above described operation can be more fully understood from the following description regarding the block diagram shown in FIG. 7 wherein various operations processed according to a program in the case of FIG. 1 are replaced by hardware and wherein the processing means 10 and a portion of sensor 20 are shown in detail.

In FIG. 7, source of light 27 (See FIG. 2) of detector 21 is connected to a source of current 221 in the processing circuit 22 which further includes a DC amplifier 222 and a discriminating circuit 223 responsive to the output of amplifier 222 for discriminating white and black. The descriminating circuit 223 provides an output "1" for a white spot and an output "0" for a black spot. The output from discriminating circuit 223 is supplied to a previous value retainer 101. The output is also sent to a comparator circuit 102 which compares the output from previous value retainer 101 and the output from discriminating circuit 223. When the tracing information changes from white to black as a result of comparison of these two outputs a "1" output will be sent to conductor 103 whereas when the information changes from black to white a "1" output will be provided for conductor 104. The "1" output on conductor 103 is applied to a memory 105 whereupon the memory 105 stores the positional information of detector 21 from a position counter 106. This condition corresponds to the movement of detector 21 from spot $P_6$ to spot $P_7$, for example, in FIG. 6. Upon further movement of detector 21, comparator circuit 102 again detects the change of from black to white to provide a "1" output on conductor 104, this output being supplied to a mean value detector 107. This condition corresponds to the movement of the detector from spot $P_9$ to spot $P_{10}$, in FIG. 6. Accordingly, the mean value detector 107 operates to calculate the mean value of the previous positional information of detector 21 which has been stored in memory 105 at this stage and the present positional information of detector 21. In this manner, the positional information of a spot near the center while the detector 21 is detecting black is determined. This central spot corresponds to spot $P_8$, for example, in FIG. 6. This mean value is stored in one of memories 108 through 111, for example 108. When another mean value information is sent during the round scanning operation such informations is stored successively in memories 109, 110 and 111.

A portion of the mean value information is also supplied to a comparator 112 where it is compared with an information from a tracing direction previous value register 113 and an information value from a tracing forbidding direction previous value register 114 and the results of comparison are successively sent to tracing direction compared value memories 115 through 118 and tracing forbidding direction compared value memories 119 through 122 to be stored therein. Information values stored in respective tracing direction compared value memories 115 through 118 are sent to a minimum value detector 123 which detects the minimum value. Among the mean value information stored in memories 108 through 111, an information value corresponding to the minimum shows a value most close to the direction of the previous tracing. This information is sent to the tracing direction memory 124 to be stored therein. Similarly the minimum value detector 123 operates to detect the minimum value of the information stored in tracing forbidding direction compared value memories 119 through 122 to determine the information most close to that of the previous tracing forbidding direction. This information is sent to a tracing forbidding direction memory 125 to be stored therein. The information representing the tracing direction is approximated to one of eight reference directions described before and is then sent to input-output circuit 15 via lines 126 and 127. As shown in FIG. 1, the output from the input-output circuit 15 is supplied to an external circuit over conductor 19 and also to the control circuit 33 of the driving mechanism 30. As a result, either one of stepping motors 31 and 32 is caused to step to move one step either detector 21 or recording paper 36. In this case, one step of motors and one step of tracing are not equal.

At each round scanning operation the contents of the previous value registers 113 and 114 are changed and the above described operations are repeated to trace a continuous curve.

Although in this embodiment, a photoelectric detector has been illustrated, it will be clear that various other types of detectors may also be used including a well known magnetic detector and an electric detector depending upon the characteristics of the sheet of drawing and the property of the printing ink.

Further, to simplify the construction of the detector movable on the surface of the drawing, the photoelectric converting element and the light source may be held stationary at points remote from the read-out head movable on the drawing and the head may be connected to the light source and the photoelectric converting element through light guides made of optical fiber glass.

With a single detector of the type described above it is necessary to move it successively for scanning. Where a plurality of discrete detectors are arranged on the periphery of a square and are operated sequentially for each scanning operation it becomes unnecessary to move the detector around a square by mechanical means.

Further instead of moving the detector around a square it can also be moved along the periphery of a hexagon, pentagon or circle.

What is claimed is:

1. The method of automatically tracing a pattern on a surface by alternately performing a round scan of the periphery of an elemental area and moving the center of said round scan an incremental distance comprising the steps of:

performing a round scanning operation along the periphery of an elemental area on said surface, each scan including sensing a regular line of spots on said periphery for detecting the presence or absence of said pattern, from spot to spot;

storing for each said scan digital code information in response to detected changes in said presence or absence of pattern, said code identifying the location on said line of spots of each branch of said pattern traversed by said scan;

comparing a stored previous value tracing direction code with said digital code information and storing a tracing direction compared value;

comparing a stored previous value tracing forbidden direction code with said digital code information and storing a tracing forbidden direction compared value;

detecting the minimum values of respective stored tracing direction and tracing forbidden direction compared values;

storing from said digital code information for said branches those codes corresponding to said minimum values as a tracing direction code and tracing forbidden direction code, respectively;

moving the center of said round scanning operation over the surface containing said pattern by said incremental distance corresponding to an adjacent position for said elemental area and in one of a set of predetermined directions, the selected direction corresponding to said stored tracing direction code;

transferring said tracing direction code and said tracing forbidden direction code to up-date the respective said stored previous value codes at each said scan; and repeating alternately said performing said round scanning operation and said moving said center said incremental distance to trace said pattern.

2. The method of claim 1 wherein the step of storing said digital code information in response to detected changes in said presence or absence of pattern includes:

detecting the adjacent digital values of the spots in one of said scans where said pattern is detected to change from white to black and from black to white and supplying the mean value of said adjacent digital values as said digital code information to be stored.

* * * * *